Jan. 5, 1965     J. DE JONG ETAL     3,164,021
COMPENSATION RADIATION PYROMETER
Filed Sept. 16, 1960
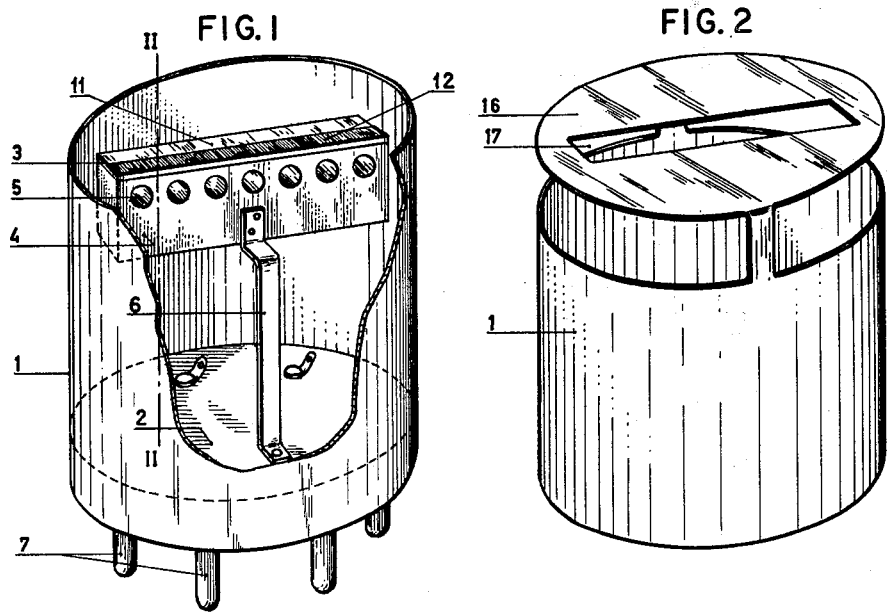
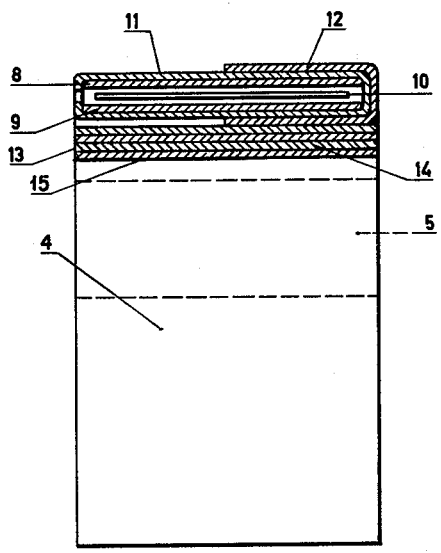
JAN DE JONG
PIETER EUSER
INVENTORS
BY Larson & Taylor

3,164,021
COMPENSATION RADIATION PYROMETER

Jan de Jong, Rijswijk, and Pieter Euser, Delft, Netherlands, assignors to Nederlandse Centrale Organisatie voor Toegepast - Natuurwetenschappelijk Onderzoek, The Hague, Netherlands, a corporation of the Netherlands
Filed Sept. 16, 1960, Ser. No. 56,528
Claims priority, application Netherlands, Sept. 21, 1959, 243,557
2 Claims. (Cl. 73—355)

The invention relates to a compensation radiation pyrometer for measuring the surface temperature of objects independently of the emission factor of the measuring surface concerned, the contact with which is for physical reasons either impossible or unpractical.

A pyrometer of this type is known from British patent specification No. 692,581 (1953). It comprises a cylindrical cavity, called a hollow thermal conductor which is open at the front and the walls of which can be heated by means of a heating coil. In this hollow thermal conductor is disposed in a black plate, called a radiation receiver, fastened on a quartz fibre which is suspended across the cavity.

Between the radiation receiver and the wall of the hollow thermal conductor is provided a differential thermo-couple for measuring the difference in temperature between these two, and on the wall of the hollow thermal conductor is provided a thermocouple for measuring the absolute temperature.

Now if an object having a temperature $T_x$ is placed opposite the hollow thermal conductor and the whole is imagined as located in a vacuum, then the temperature of the radiation receiver $T_s$ will have a value lying between $T_x$ and the temperature of the walls of the hollow thermal conductor $T_p$. If this latter temperature $T_p$ is controlled with the aid of a heating coil in such a way that $T_p=T_s$, which is ascertained by means of a differential thermo-couple, it follows therefrom that $T_s=T_x$. Therefore, the equality of $T_x=T_s=T_p$ means that the hollow thermal conductor is surrounded by walls of equal temperature; so that in this cavity a field of black radiation prevails.

The adjustment of this field is independent of the emission coefficient of the walls of the hollow thermal conductor, of which walls the measuring surface, therefore, forms part.

In the practical realization it suffices to measure the temperature $T_p$ of the hollow thermal conductor to learn the temperature $T_x$ of the measuring surface, if the requirement has been met that there should be no difference in temperature between the radiation receiver and the walls of the hollow thermal conductor.

A drawback of this pyrometer is that a long adjusting time (=response), i.e. of a few minutes, is required for finding the state of equilibrium.

Another drawback is that, unless measurement is effected in vacuum, the convection currents in the hollow thermal conductor may considerably impede the measurement. It is, therefore, assumed as a matter of course, that both the measuring surface and the pyrometer are disposed in vacuum. As this will often be a necessary condition for a correct measurement, this entails the additional drawback of the method remaining restricted to some few very special uses. The hollow thermal conductor might be entirely closed off with a thin plate which would let through the whole radiation spectrum, but this is a requirement which can not be entirely met, especially not in the region of low-temperature radiation.

It is the object of the invention to provide a compensation radiation pyrometer according to the present invention, which is founded on the same physical principle, all the above-mentioned drawbacks have been removed, whilst it combines an increased sensitivity with an extremely reduced adjusting time (response).

In addition to this the construction has been considerably simplified which has helped to minimize its total dimensions.

The construction is characterized in that the radiation receiver comprises a multiple differential thermo-couple formed by a constantan wire wound as a helix, half of each winding of which is coppered, a measuring thermo-couple disposed inside said windings and a heating element provided behind and parallel to said radiation receiver, the parts of the whole being insulated with respect to each other and being assembled into one single element.

The radiation receiver, which comprises a multiple differential thermo-couple, serves as zero indicator of the black radiation equilibrium.

The difference in temperature between the side of the radiation receiver facing the measuring surface and its back-side, is indicated by this multiple differential thermo-couple, and the absolute temperature is indicated by the measuring thermo-couple provided inside the windings. The heating element is provided immediately after and parallel to the back side of the radiation receiver, so that the whole is assembled into one single element, which results in a very considerable reduction of the adjusting time (response).

The construction is simple, and is characterized in that the radiation receiver comprises two thin ribbons of an electrical insulation material having a very slight heat-conducting capacity, between which has been provided a measuring couple of ribbon-shape, the whole being enveloped by the helix of constantan wire in such a manner that the junction of each coppered helical half-turn is disposed substantially in the middle of each flat side.

Because the side of the radiation receiver (=multiple differential thermo-couple) which is turned towards the measuring surface is approached very near to said measuring surface and because the space between said measuring surface and the radiation receiver forms the hollow thermal conductor, troublesome convection currents are largely suppressed.

In order to prevent the radiation from the measuring surface from entering the open protective casing, the side of the multiple thermo-couple (=radiation receiver) which is turned towards the measuring surface can be freely positioned inside an aperture recessed in a shining protective shield.

The invention will hereinafter be further illustrated with the aid of drawings, in which an embodiment of the compensation radiation pyrometer according to the invention is schematically shown by way of example.

In these drawings:

FIGURE 1 shows a perspective view of the compensation radiation pyrometer,

FIGURE 2, a perspective view of the protective shield,

FIGURE 3, a transverse cross-section through the radiation receiver on the line II—II of FIG. 1.

In the compensation radiation pyrometer as shown in FIG. 1, 1 represents a cylindrical protective casing mounted on a base 2. Inside the protective casing is disposed the radiation receiver (=multiple differential thermo-couple) which is assembled into one single element 3 having a measuring thermo-couple and a heating element, which will be further described hereinafter. The element 3 is mounted on a carrier 4 of temperature-proof material having a very slight heat-conductivity and a slight capacity, such as for instance Teflon. In order to obtain a minimal heat conduction, perforations 5 have been provided in the region along the upper rim on to which the element 3 is fixed.

The carrier 4 again is, with the aid of the support 6, fixed on to the base 2, in which are provided contact pins 7 for diverse current wires and measuring wires, which for the sake of clarity have been omitted in the drawing.

In FIGURE 2 is represented a cross-section of the element 3 along the line II—II of FIG. 1 on a considerably enlarged scale.

A measuring thermo-couple 10, for instance a chromel-alumel thermo-couple constructed as a thin ribbon, is disposed between two thin ribbons 8 and 9 of for instance Teflon. A constantan wire 11, the helical half-turns 12 of which have been coppered, is wound round the two ribbons 8, 9. These windings are provided in such a manner that each junction lies substantially in the middle of each flat side. A Teflon ribbon 13 is provided against the bottom of the multiple differential thermo-couple 11, 12 and under this ribbon a heating element 15, wound as a helix round a Teflon ribbon 14.

The whole is assembled into one single element and arranged on the upper rim of a carrier 4. The dimensions of said element can be kept very small; in the embodiment of the invention its length is 18 mm., its breadth 2 mm., and its thickness 1 mm. The number of thermocouples amounts to 60 per running cm.

The adjusting time (response) of the compensation radiation pyrometer here described amounts to about 30 seconds, the measurements in the temperature range up to about 250° C. having an accuracy of up to about 98%.

Measurements have shown that, in the embodiment having an open protective casing 1, the air velocities (convection) not being too high, the phenomena at the rim caused by the finite dimensions of the radiation receiver (=front side of the multiple differential thermo-couple), were hardly perceptible.

In order to prevent the compensation radiation pyrometer from causing too great a disturbance of the temperature of the measuring surface as a result of the radiation in the open protective casing 1, a shining protective shield 16 can be provided, having an oblong aperture 17, which leaves the element 3 clear, all of this as represented in FIG. 3.

Although the carrier 4 could be mounted directly on the base 2, the provision of the support 6 gives the advantage that the space between the element 3 and the base 2 is a little larger and can serve as temperature buffer so as to have the temperature decrease by slow degrees from the pyrometer towards the contact fibres on the pins 7.

In view of the low capacity of the well-insulated composite element 3, the necessary power required for heating up and for compensating the radiation issuing from the measuring surface can be extremely low.

Because the adjusting time (response) of the compensation radiation pyrometer according to the invention is so short, continuous measuring with normal controlling instruments is practicable.

As a matter of course there are possibilities of extending the temperature range of the compensation radiation pyrometer here described to a higher temperature, if, instead of Teflon ribbons, for instance mica is applied, and for the thermo-couples some material which is proof against the higher temperature. In this case the carrier 4 can for instance be made of some ceramic material.

With the compensation radiation pyrometer according to the invention measurement can also be effected on shining surfaces with an emission factor <0,1.

We claim:
1. Compensation radiation pyrometer for measuring the surface temperature of objects, the contact with which is for physical reasons either impossible or unpractical, and comprising:
  a multiple differential thermocouple comprising two thin plate ribbons of flat electrical insulation material having a very slight heat-conducting characteristic;
  a measuring thermocouple being positioned between the two ribbons;
  the whole being enveloped by a plurality of turns of constantan wire forming a helix, corresponding half-turns of which are coppered and forming a radiation receiver;
  said helix being positioned in such a way that the junctions of the coppered helical half-turns are disposed substantially in the middle of each flat side; and
  a heating element being disposed juxtaposed under and parallel to said radiation receiver and adjacent to the cold junctions of said helix;
  insulation means encompassing a substantial portion of the radiation receiver and also interposed between the radiation receiver and the heating element and the entire structure being assembled into one single unit.

2. Compensation radiation pyrometer as claimed in claim 1 and including:
  a reflective protective shield with an aperture recessed in it;
  the compensation radiation pyrometer being disposed within said aperture; and
  the radiation-receiving surface of the pyrometer being substantially in the same plane as the upper surface of the protective shield.

References Cited by the Examiner

UNITED STATES PATENTS

| | | |
|---|---|---|
| 1,988,858 | 1/35 | Quereau. |
| 2,305,396 | 12/42 | Volochine _____ 73—355 |
| 2,310,026 | 2/43 | Higley. |
| 2,666,089 | 1/54 | Grier et al. _____ 73—355 |
| 2,807,657 | 9/57 | Jenkins et al. _____ 136—4 |

FOREIGN PATENTS 692,581   6/53   Great Britain.

OTHER REFERENCES

Page 326, 1920, Journal of the Physical Society of London, "The Construction of Thermocouples by Electrodeposition."

Pages 796 and 797, 1930, Bureau of Standards Journal of Research, "Measurement of Surface Temperatures."

ISAAC LISANN, *Primary Examiner.*